April 30, 1935. J. J. DRABIN 1,999,871
GENERATOR CONTROL
Filed May 28, 1934
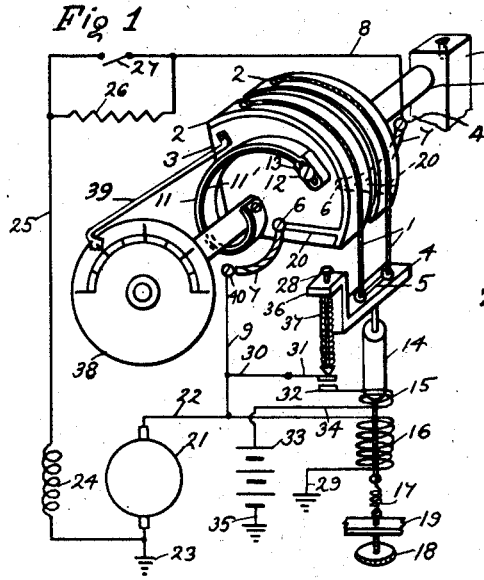
John J. Drabin
INVENTOR
BY John P. Nironon
ATTORNEY Patented Apr. 30, 1935

1,999,871

UNITED STATES PATENT OFFICE 1,999,871

GENERATOR CONTROL

John J. Drabin, New York, N. Y.

Application May 28, 1934, Serial No. 727,858

4 Claims. (Cl. 171—313)

My invention relates to generator control and has particular reference to devices and arrangements for controlling the voltage of a battery charging generator.

My invention has for its object to provide a voltage control system for generators connected with automobile engines or other similar prime movers of variable speed, preferably when such generators float on the batteries.

Another object of my invention is to provide a voltage regulating field rheostat automatically controlled by an electromagnetic device energized by the current from the generator. In my arrangement the field rheostat is gradually short circuited to a greater or lesser degree by the electromagnetic device in accordance with the changes in the generator voltage as caused by the changes in the engine speed. My regulating device adjusts also the changes in the charging voltage as caused by the different degree of charge of the battery. For this purpose I use a rotary member operatively connected with the electromagnetic device, such as a solenoid or electric motor, this rotary member having curved contact surfaces bearing against the resistor and progressively short circuiting the same. With my device it is possible to judge of the degree of charge of the battery by the angular position of the short circuiting rotary member, and in order to facilitate the observation of its position, I provide an extension on its shaft with an indicating hand moving around a calibrated dial. The latter may be conveniently placed on the dash board of an automobile. I also use the rotary member to operate the battery cut-out switch, thereby combining the voltage regulator and the cut-out switch in one apparatus.

While the electromagnetic device exerts a positive pull on the rotary member when the generator voltage rises, the return movement is controlled by a spring. In order to use this spring as a temperature compensating device, I make it of two metals having different temperature coefficients so adjusted, that the resiliency of the composite bimetallic spring varies in accordance with the variations in the resistance of the field rheostat and windings caused by the temperature variations.

I also provide a supplementary resistor connected with the voltage regulating rheostat with a switch for short circuiting this resistor. I mechanically connect this switch with a switch controlling the automobile lamps or similar load so that the supplementary resistor becomes short circuited when the lamps are switched in, thereby providing a higher charging voltage and preventing the excessive discharge of the battery. With the lamps switched off, the supplementary resistor is connected in, reducing the generator voltage.

In order to indicate when the generator ceases to charge the battery and is disconnected by the cut-out switch, I provide a visual signal, such as a lamp, operated when the cut-out switch is opened.

My invention is more fully described in the accompanying specification and drawing in which—

Fig. 1 is a diagrammatic view of my mechanism and electrical connections, Fig. 2 is a similar view of a modified device, Figs. 3 and 4 are two views of another modification, Fig. 5 is a partial view of another modification, and Fig. 6 is a partial view of still another modification.

My voltage regulating device consists of two flexible wires or cables 1 made of a suitable resistance alloy, such as nichrome. These cables are attached at one end to curved metal plates 2 mounted on a block 3 made of an insulating material. The plates are made of some metal having high electrical conductivity, for instance copper, so that portions of cables lying on the plates become short circuited, the total resistance of the cables being correspondingly reduced. The other ends of the cables are attached to an insulation block 4 and are connected together by a metal bar 5. The plates 2 are insulated from each other and connected by metal strips with screws 6 to which flexible insulated leads 7 are attached. The other ends of these leads are connected with leads 8 and 9. The block 3 is rotatively mounted on a stationary shaft 10 held in brackets 74. A spiral spring 11 is attached with one end to the shaft 10, the other end being attached to the block 3 by a screw 12. The end of the spring has an elongated slot 13 for the screw 12 in order to provide for the adjustment of the tension of the spring. The spring itself consists of two layers, 11 and 11', made of two metals having different temperature coefficients, so that the spring changes its resiliency for different temperatures, thereby compensating for the change of resistance of the wires 1 and other parts of the electrical system with the variations in temperature. An iron plunger 14 is suspended from the block 4 and slides in coils 15 and 16. A helical spring 17 is attached to the end of the plunger 14 and is hooked to a tension adjusting screw 18 mounted in a stationary bracket 19.

The lead 9 is connected with a generator 21 through a lead 22. The other generator terminal is connected with the ground at 23 and with one end of a field winding 24. The other end of the winding is connected by a lead 25 with the lead 8 through a supplementary resistor 26. The latter may be short circuited by a switch 27 mechanically connected with a switch controlling the lamps of an automobile (not shown) or other load, such as radio etc. The generator lead 22 is connected with a shunt winding 16 of a magnet operating the plunger 14. The other end of the coil 16 is grounded at 29. A lead 30 extends from the lead 9 to a contact spring 31 mounted above a contact block 32, the members 31 and 32 forming a cut-out switch for a battery 33. The latter is connected by a lead 34 with the series coil 15 of the magnet, the other battery terminal being grounded at 35. A rod 28 engages the bar 31 and is slidably mounted in a lug 36 at the end of the block 4. A spring 37 presses the rod 28 against the bar 31. A stationary dial 38 is supported on the end of the shaft 10 and is calibrated in convenient units indicating the degree of charge of the battery. A hand or pointer 39 is attached to the block 3 and extends to the front of the dial.

The operation of my device is as follows.

With the engine standing still, the generator 21 is disconnected from the battery by the cut-out switch, the plunger 14 being raised to its highest position by the cables 1 pulled up by the block 3 under action of the retrieving spring 11. After the engine is started and the generator begins to build up its voltage, the coil 16 will begin to pull the plunger 14 down. As soon as the generator voltage reaches the charging value, i. e. somewhat higher than the battery voltage, the contact points 31 and 32 will be closed by the pressure from the rod 28, thereby connecting the series coil 15 in the circuit between the generator and the battery and permitting the current from the generator to flow into the battery. The circuit closing point is determined by the combined resistance of the springs 11, 17 and 37, the spring 17 working in opposition to the other two. The closing point can be adjusted by turning the screw 18, and some adjustment can be also made by shifting the end of the spring 11 under the screw 12. The latter adjustment, however, is used principally for regulating the temperature compensation feature of the bi-metallic spring 11.

With the further increase in the engine speed the generator voltage will be also increased with a result that the magnet will pull stronger on the plunger 14 thereby pulling down the cables 1 and turning the block 3. The longer free portions of the cables will have greater resistance thereby reducing the current in the generator field winding and, as a result, bringing down its voltage. The indicating pointer 39 will show the position of the block 3 thereby indicating also the condition of the battery charge, taking into consideration the known engine speed. Additional regulation is provided by the resistance 26 which is switched off or short circuited when there is a heavy lamp load. The flexible cables 7 attached to the block 3 at the ends of connectors 20 permit the limited rotational movement of the block 3. The other ends of these cables are attached to stationary insulated supports and connected with the leads 8 and 9.

The series coil 15 increases the strength of the magnet pull by compounding its action, so that it responds to the rise of the current as well as of the voltage. With this arrangement no other voltage regulation is necessary, and the generator may be of an ordinary shunt wound type without the regulating third brush.

The supplementary resistance 26 may be connected in any convenient place in the generator field circuit.

A modified arrangement is shown in Fig. 2. Here the resistor cables 1 are wound on a cylinder 41 covered on the periphery with a single metal plate 42 which establishes metallic connection between the cables 1. The free ends of the cables are connected to the upper end of an insulation block 43. Metal strips 44 extend from the ends of the cables along the sides of the block and are engaged by contact springs or brushes 45 connected as shown with the field winding 24 of the generator 46. A plunger 14 is operated by a single solenoid 47 connected with the generator through the ground 29. Springs 11 and 17 control the tension of the cables. A third strip 48 is connected by a flexible cable 49 with the battery 33 through a cut-out switch 48' of an ordinary construction. This cut-out switch has two windings, one connected in shunt with the generator, the other in series, the construction and connections being similar to the windings shown in Fig. 1. The connections of the cut-out switch are not shown, being of an ordinary and well known type.

In case the auxiliary series coil 15 is omitted, the generator 46 may be of a voltage regulating type with a third brush 50.

Another modification is shown in Figs. 3 and 4. Here the resistor cables 1 are stretched between stationary terminals 51 and 52 connected with leads 25 and 9 respectively, and an insulation block 53. The upper ends of the cables are connected together on the block by a connector 54. The block 53 is supported on the lower end of a flat spring 55 the upper end of which is mounted on a shaft 56. A rotary member 57 is in the shape of a curved bar pivotally mounted on a shaft 58 and is provided with an arcuate iron armature or plunger 59. The curved bar 57 is made of metal and is adapted to short circuit the portion of cables 1 against which this bar is pressed. The tension of the spring 55 is regulated by a screw 60 supported in a bracket 61. The magnet coils 15 and 16 are connected as in Fig. 1. The battery cut-out switch is formed of two spring contact members 62 and 63 which are connected together when the bar 57 begins to recede from the cables 1. The contact spring 62 also closes a contact with a bar 64 connected with an electric lamp 65 or similar signalling device. The lamp is burning when the battery is disconnected from the generator thereby indicating that the battery is being discharged. With this arrangement it is not necessary to have an ammeter on the dash board.

Another modification is shown in Fig. 5. The cylinder 41 is mounted on a shaft 66 on which a rotary armature 67 is mounted. The armature rotates between the poles of a magnet 68. Otherwise the device is similar to the devices shown in Figs. 1 and 2.

Another modification is shown in Fig. 6. Here the resistor is formed in the shape of two flat springs 69 and 70 joined together at one end and attached to a shaft 71. The latter carries a motor armature 67. The springs are bent in the shape of spirals with progressively increasing clearance between them. The ends of the spirals are mounted on an insulation block 72 and connected with leads 9 and 25. With this arrangement the greater angle of rotation causes a larger portion of the spirals to come in contact with each other. The armature 67 is therefore placed so in the field magnet that the spirals become unwound with the increased voltage of the generator. The resistor, however, may be connected in parallel with the field winding, in which case the spirals must be wound closer with the increased voltage.

Such alternative arrangement of the resistor can be made, of course, also with the modifications shown in the other figures.

Important advantages of my generator control are that it provides an automatic voltage regulation, taking care of the variations of the engine speed, as well as of the variations of the battery voltage during its charge. My control has no vibrating or sparking contacts, the resistance being varied gradually and automatically, and no other voltage regulating devices are necessary with my system. I also combine in a single apparatus the voltage regulator and the battery cut-out switch. I also provide temperature compensating device, and an indicator showing the condition of the battery.

My voltage regulator tends to maintain the battery fully charged. At the same time it eliminates the undesirable possibility of overcharging the battery. This is accomplished by the setting of the regulator to a certain safe voltage which it will not exceed. Then whenever the battery reaches its highest charge, the greatest resistance is introduced into the generator field, thereby equalizing the difference between the battery and generator voltages.

I claim:—

1. In a generator control, the combination with a resistor consisting of two flexible cables in parallel alignment, of a rotary member, the outer surface of said member being made of an electricity conducting material, means to stretch said cables, said rotary member being adapted to engage said cables with its outer surface thereby short circuiting a variable portion of their length, an electric generator for charging a storage battery, said resistor being connected with the field winding of said generator, an electromagnetic means for rotating said rotary member, said electromagnetic means being energized by said generator, and means for connecting said generator with said battery when the generator voltage reaches a predetermined charging value, said connecting means being adapted to be operated by said electromagnetic means.

2. In a generator control, the combination with a resistor consisting of two parallel flexible cables, of a rotary member adapted to engage said cables with its curved outer surface, said surface being of a conducting material and adapted to short circuit the portion of said resistor in contact with said surface, a battery charging generator, said resistor being connected with the shunt field winding of said generator, an electromagnetic device for rotating said member, said device being adapted to be energized by the current from said generator, and means to connect said generator with said battery when the voltage of said generator reaches a predetermined charging value, said connecting means being adapted to be operated by said electromagnetic means.

3. In a generator control, the combination with a resistor consisting of two parallel flexible cables, of a rotary member adapted to engage said cables with its outer curved surface, said surface being of a conducting material and adapted to short circuit the variable portion of length of said cables, a resilient means for keeping said cables under tension, a battery charging generator, an electromagnetic means for rotating said member, said electromagnetic means being adapted to be energized by the current from said generator, a retrieving means for said rotary member, said resistor being connected with the field winding of said generator, and means for connecting said generator with said battery when the generator voltage reaches a predetermined charging value, said means being adapted to be operated by said electromagnetic means.

4. In a generator control, the combination with a resistor of a rotary member in a cooperative relation with said resistor, said resistor being connected with the field winding of a battery charging generator, said rotary member being adapted to short circuit a variable portion of said resistor, a magnet adapted to be energized by said generator and further adapted to turn said rotary member, and a retrieving spring on said rotary member, said spring being made of two metals having different temperature coefficients for varying the resistance to rotation of said member in accordance with variations in the temperature.

JOHN J. DRABIN.